428-192
9/16/86 XR 4,612,232
SP

United States Patent [19]

Obara et al.

[11] Patent Number: 4,612,232

[45] Date of Patent: Sep. 16, 1986

[54] ROLLED THERMAL TRANSFER CARBON RIBBON STRUCTURE WITH LEAD TAPE

[75] Inventors: Takeshi Obara, Nigata; Toshirou Gotou; Kazuyuki Kobayashi, both of Iwate, all of Japan

[73] Assignee: Kabushiki Kaisha Sato, Japan

[21] Appl. No.: 688,435

[22] Filed: Jan. 2, 1985

[30] Foreign Application Priority Data

Feb. 23, 1984 [JP] Japan ............................ 59-23810[U]

[51] Int. Cl.⁴ ........................ B32B 3/16; B65H 81/06; C09J 7/02

[52] U.S. Cl. .................................... 428/172; 156/184; 156/250; 206/389; 428/40; 428/192; 428/244; 428/343; 428/352

[58] Field of Search ................... 428/343, 99, 156, 57, 428/352, 192, 58, 40, 172, 244; 156/184, 250; 206/389

[56] References Cited

U.S. PATENT DOCUMENTS 3,142,609 7/1964 Deretchin et al. .................... 428/57
4,091,168 5/1978 Kawamata ........................ 428/57 X
4,379,012 4/1983 Heymanns ........................ 428/40 X
4,379,114 4/1983 Fujiki et al. ..................... 428/57 X
4,414,258 11/1983 Corbin, Sr. ..................... 428/343 X

*Primary Examiner*—Thomas J. Herbert
*Attorney, Agent, or Firm*—Ostrolenk, Faber, Gerb & Soffen

[57] ABSTRACT

A web in the form of a thermal transfer carbon ribbon has a lead tape adhered to the leading end of the web, that is to the outermost end portion of the web wound upon a core. The lead tape includes a base and a pressure-sensitive adhesive layer backing the base. The lead tape is adhered to the surface of the outermost circumference of the carbon ribbon and the end of the lead tape tape is coextensive with the end of the carbon ribbon, which strengthens the then leading end of the carbon ribbon. In forming this carbon ribbon and lead tape combination, the carbon ribbon is let off from a thickly rolled raw ribbon and is taken up on a core. The lead tape is applied to the running surface of the carbon ribbon on the raw roll at the location immediately before the carbon ribbon has been fully taken up on the core. Then the carbon ribbon is cut at the trailing end of the lead tape when the carbon ribbon has been substantially fully taken up to make the ends of the carbon ribbon and of the lead tape coextensive.

12 Claims, 4 Drawing Figures

ROLLED THERMAL TRANSFER CARBON RIBBON STRUCTURE WITH LEAD TAPE

BACKGROUND OF THE INVENTION

I. Field of the Invention

The present invention relates to a rolled web and, more particularly, to a structure of a rolled thermal transfer carbon ribbon with a lead tape, which has its production efficiency improved.

II. Description of the Prior Art

Thermal transfer carbon ribbons are widely used in printers, or the like, for printing indicia. Such ribbon has a leading end, which is the end that is charged or fed first into the printer. On a roll of ribbon, the leading end is the outer end. Since a thermal transfer carbon ribbon is thin and weak, however, a separate lead tape is usually adhered to the leading portion of the carbon ribbon, which is the portion adjacent the leading end, to ensure the strength of the carbon ribbon when the printer is to be charged with the carbon ribbon and also to protect the outer circumference of the carbon ribbon.

The step of adhering the lead tape to the leading portion of the thermal transfer carbon ribbon is not performed until after the leading end of the carbon ribbon rolled on a core has been cut. Specifically, the lead tape prepared in advance is applied to the previously cut leading portion of the rolled carbon ribbon. As a result, the production of the rolled thermal transfer carbon ribbon with the lead tape requires such troublesome manual work that its production efficiency is low.

SUMMARY OF THE INVENTION

The present invention overcomes the problem with the prior art. Its primary object is to provide a structure of a rolled thermal transfer carbon ribbon with a lead tape, the production efficiency of which can be improved by conducting the lead tape adhering work on the carbon ribbon assembly line.

Another object of the present invention is to provide an efficient process for producing the rolled thermal transfer carbon ribbon structure with the lead tape.

According to the present invention, the rolled web structure comprises a rolled thermal transfer carbon ribbon and a lead tape including a base and a pressure-sensitive adhesive layer backing the base. The lead tape is adhered through its pressure-sensitive adhesive layer to the outer surface of the outermost circumference of a roll of the thermal transfer carbon ribbon in a substantially coextensive manner. This ensures the strength of the thermal transfer carbon ribbon when the thermal transfer carbon ribbon is used and it protects the outer circumference of the rolled ribbon. As a result, adhering of the lead tape to the thermal transfer carbon ribbon can be conducted on the carbon ribbon production or assembly line to improve the production efficiency of the structure of the rolled thermal transfer carbon ribbon.

A process for producing a rolled web of thermal transfer carbon ribbon comprises a number of steps. One first lets off a thermal transfer carbon ribbon from a thickly rolled raw ribbon roll and takes up the thermal transfer carbon ribbon on a core. Next, one adheres a lead tape having an adhesive back to the running surface of the thermal transfer carbon ribbon immediately before the desired length of that ribbon is fully taken up. Then, one cuts the thermal transfer carbon ribbon at the trailing end of the just applied lead tape when the thermal transfer carbon ribbon is substantially fully taken up. Now, the cut end of the thermal transfer carbon ribbon, with the lead tape applied upon it, may provide a leading end when the thermal transfer carbon ribbon is later used.

In view of the foregoing, the lead tape adhering step can be conducted on the carbon ribbon web assembly line to improve the production efficiency of the structure of the rolled thermal transfer carbon ribbon.

Other objects, features and advantages of the present invention will become apparent from the following description taken with reference to the accompanying drawings.

DESCRIPTION OF THE PREFERRED EMBODIMENT

Figure 1:
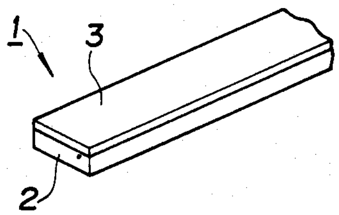
FIG. 1 Prior Art
FIG. 1 is a perspective view showing the structure of thermal transfer carbon ribbon.
Figure 2:
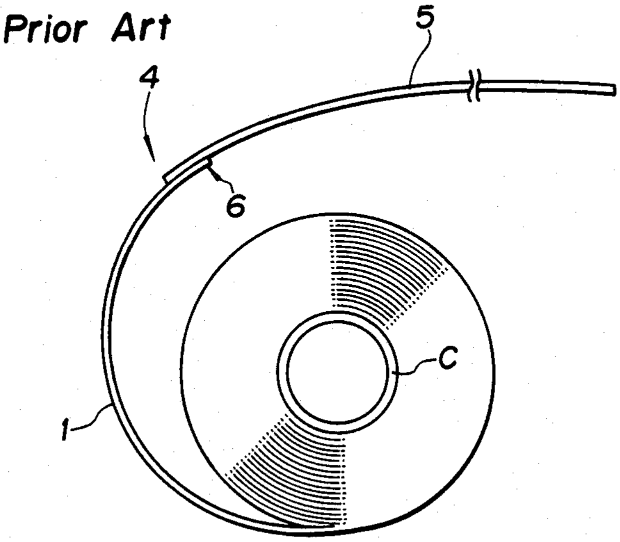
FIG. 2 Prior Art
FIG. 2 is a side elevational view showing the structure of a rolled thermal transfer carbon ribbon with a lead tape according to the prior art.

A rolled thermal transfer carbon ribbon for which a lead tape according to the present invention may be used is shown in FIGS. 1 and 2. As shown in FIG. 1, the thermal transfer carbon ribbon 1 comprises a carbon ink layer 3 applied to the surface of a ribbon base 2. The thermal transfer carbon ribbon thus formed is rolled on a core C, as shown in FIG. 2, and a lead tape 5 is conventionally adhered to the leading or exposed end portion 4 of the carbon ribbon 1. The leading end portion 4 of the carbon ribbon 1 has a foremost or outer end 6 and the lead tape 5 protrudes well beyond the ribbon end 6.

Figure 3:
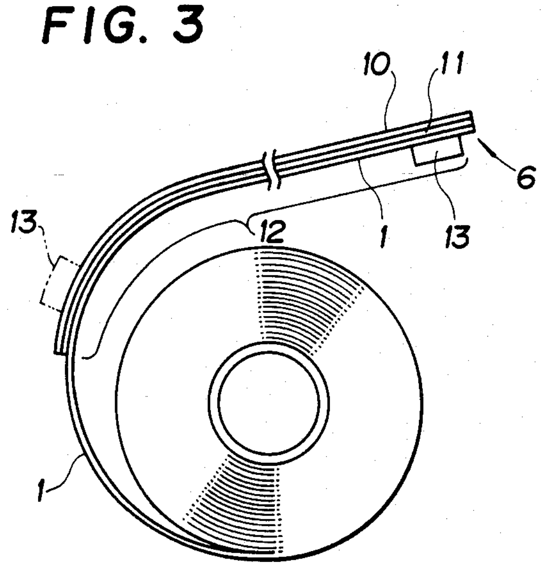
FIG. 3 is a view similar to FIG. 2, but showing one embodiment of the present invention.
Figure 4:
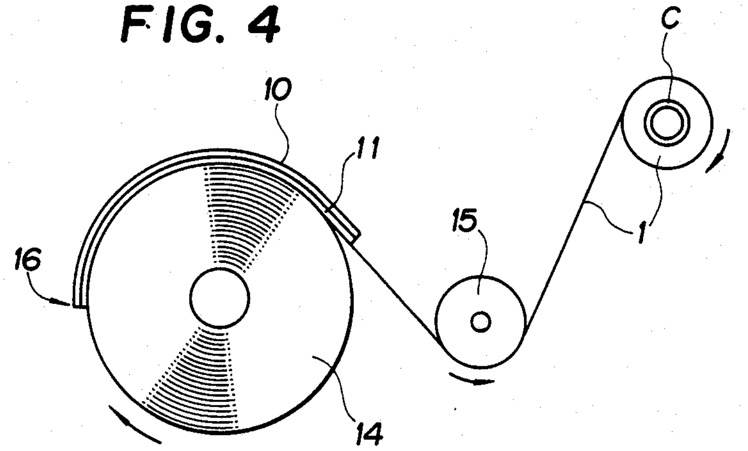
FIG. 4 is a schematic side elevational view showing a process for producing a rolled thermal transfer carbon ribbon according to the invention.

Referring to FIGS. 3 and 4, an embodiment of the present invention is described below. However, the same parts or portions as those shown in FIGS. 1 and 2 are indicated by the same reference numerals, and their repeated explanations are omitted.

A lead tape 10 is backed with a pressure-sensitive adhesive layer 11. The lead tape 10 thus formed is adhered through its pressure-sensitive adhesive layer 11 to the surface of the outermost circumference 12 of the thermal transfer carbon ribbon 1 in a substantially coextensive manner. As a result, the lead tape does not extend beyond the end of the carbon ribbon, but instead they have the same free end. Moreover, a double-coated adhesive tape 13 is used to temporarily adhere the coextensive ends of the lead tape 10 and the carbon ribbon 1 to the remaining rolled body of the carbon ribbon 1. The adhered position of the double-coated adhesive tape 13 may be located in accordance with the producing process and/or the material of the lead tape 10 such that the adhesive tape 13 is adhered to the outer surface or to the back or underside of the lead tape 10.

The lead tape 10 may be made of a flexible film of a material such as plastic or metal. In case paper is used as the material of the lead tape 10, however, it is desirable to form a layer of a parting agent on the surface of the lead tape 10. Moreover, the lead tape 10 may have an arbitrary length in accordance with the internal structure of the printer, or the like, to be charged with the thermal transfer carbon ribbon and/or the size of the roll of the carbon ribbon.

FIG. 4 schematically shows the process of producing the rolled thermal transfer carbon ribbon 1 with the lead tape 10. The carbon ribbon is let off from a thickly rolled raw ribbon roll 14 and is subsequently taken up on the core C after passing a guide roll 15. Then, the lead tape 10 is adhered to the running surface of the thermal transfer carbon ribbon 1 immediately before the preset length of the carbon ribbon 1 is fully taken up. After that, the carbon ribbon 1 is cut at the trailing end or rearmost end 16 of the lead tape 10 when the carbon ribbon 1 is substantially fully taken up. As a result, the cut end of the carbon ribbon 1 in turn provides a leading end when the printer, or the like, is to be subsequently charged with the carbon ribbon 1 on the core C.

As has been described hereinbefore, according to the present invention, the thermal transfer carbon ribbon need not previously have been cut when the lead tape is to be adhered thereto so that its production efficiency can be improved.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A rolled web with lead tape comprising:

a rolled web, including a first leading end, which is the outermost free end of the rolled web, and a leading end portion at the leading end; said rolled web being in the form of a thermal transfer carbon ribbon web; and a lead tape including a base layer and a pressure-sensitive adhesive layer backing the base layer; the lead tape adhesive layer being adhered to the outer surface of the outermost circumference of the rolled web and overlapping the whole leading free end of the rolled web; the lead tape having a respective second leading end thereof; the second leading end being substantially coextensive with the first leading end of the web to which the lead tape is adhered, for strengthening the leading end portion of the web and prevent tearing between the lead tape and the carbon ribbon, and the lead tape wrapping around the outermost circumference of the web for further protecting the web.

2. The rolled web and lead tape of claim 1, wherein the base layer of the lead tape is comprised of flexible film material.

3. The rolled web and lead tape of claim 2, wherein the base layer of the lead tape is comprised of plastic.

4. The rolled web and lead tape of claim 2, wherein the base layer of the lead tape is comprised of metal.

5. The rolled web and lead tape of claim 2, wherein the base layer of the lead tape is comprised of a flexible film of paper.

6. The rolled web and lead tape of claim 5, wherein the base layer has an outer surface opposite the web and a parting agent being formed on the outer surface of the lead tape.

7. The rolled web and lead tape of claim 1, further comprising a double-coated adhesive tape placed for temporarily adhering the coextensive ends of the lead tape and the web to the remaining rolled web.

8. The rolled web and lead tape of claim 7, wherein the double-coated adhesive tape is temporarily adhered to one of the outer surface of and the back of the lead tape.

9. A process for producing a rolled flexible web, comprising:

feeding a length of the web to a core and taking up the length of the web on the core;

adhering a short length of lead tape having an adhesive back to the outer running surface of the web which is being taken up on the core at a location on the web immediately before the web has been fully taken up on the core; and cutting the web at the trailing end of the lead tape when the web is substantially fully taken up on the core for the cut end of the web and the trailing end of the adhered lead tape together to provide a leading end of the web during subsequent unwinding of the web from the core.

10. The process of claim 9, wherein the web is first let off from a thickly rolled raw web roll and is fed therefrom to be taken up on the core.

11. The process of claim 9, wherein the feeding of the web is from a raw web roll, and the lead tape is adhered to the web by applying the lead tape to the outermost circumference of the raw web roll before it is let off from the thickly rolled raw web roll, for ensuring adhesion of the adhesive back of the lead tape to the outer running surface of the web.

12. The process of claim 9, wherein the web comprises a thermal transfer carbon ribbon.

* * * * *